US012612308B2

(12) United States Patent
Tokutake

(10) Patent No.: US 12,612,308 B2
(45) Date of Patent: Apr. 28, 2026

(54) OZONE GENERATING APPARATUS

(71) Applicant: SUMITOMO PRECISION PRODUCTS CO., LTD., Hyogo (JP)

(72) Inventor: Shigekazu Tokutake, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 723 days.

(21) Appl. No.: 18/040,250

(22) PCT Filed: Apr. 26, 2021

(86) PCT No.: PCT/JP2021/016681
§ 371 (c)(1),
(2) Date: Feb. 1, 2023

(87) PCT Pub. No.: WO2022/030050
PCT Pub. Date: Feb. 10, 2022

(65) Prior Publication Data
US 2023/0271832 A1 Aug. 31, 2023

(30) Foreign Application Priority Data
Aug. 4, 2020 (JP) ................................. 2020-132350

(51) Int. Cl.
*C01B 13/11* (2006.01)

(52) U.S. Cl.
CPC ........ *C01B 13/115* (2013.01); *C01B 2201/90* (2013.01)

(58) Field of Classification Search
CPC ... C01B 13/115; C01B 2201/90; C01B 13/11; C01B 2201/76; C01B 2201/64;
(Continued)

(56) References Cited

U.S. PATENT DOCUMENTS

2012/0219460 A1* 8/2012 Okihara ................. B01J 19/088
422/111

FOREIGN PATENT DOCUMENTS

CN 102126707 A 7/2011
CN 103885511 A 6/2014
(Continued)

OTHER PUBLICATIONS

International Search Report and Written Opinion (ISA/JP) for International Application No. PCT/JP2021/016681 mailed Jul. 20, 2021 (11 pages).

*Primary Examiner* — Xiuyu Tai
(74) *Attorney, Agent, or Firm* — Buchalter LLP

(57) ABSTRACT

The control device includes a storage configured to store two or more functions indicating a relationship between the power source output and the ozone concentration corresponding to the power source output in accordance with different gas flow rates in the ozone generator. The control device obtains a first power source output corresponding to the set ozone concentration and a second power source output corresponding to the detected ozone concentration based on the set ozone concentration of the ozone generator, an index indicating the gas flow rate of the ozone generator, the detected ozone concentration, and the two or more functions, and executing feedback control of controlling the power source output based on a difference between the first power source output and the second power source output.

5 Claims, 5 Drawing Sheets

(58) Field of Classification Search

CPC ............ C01B 2201/40; C01B 2201/22; C01B 2201/62; C01B 13/10; C01B 2201/14; B01J 19/08; B01J 19/088; B01J 2219/0805; B01J 4/008; B01J 2219/00164; B01J 2219/00162; B01J 2219/00038; H10P 72/0604; H10P 72/0402; G03F 7/423; H02M 7/06; G05D 11/138; C02F 1/78; C02F 2201/782; A61L 2/202; A61L 2/26; A61L 9/015

See application file for complete search history.

(56)         References Cited

FOREIGN PATENT DOCUMENTS

| GB | 2403213 A | * | 12/2004 |
|----|-----------|---|---------|
| JP | 54-155991 A | | 12/1979 |
| JP | 2005126267 A | * | 5/2005 |
| JP | 4085043 B2 | | 4/2008 |
| JP | 2009-500855 A | | 1/2009 |
| JP | 2009-046345 A | | 3/2009 |
| WO | WO 2011/065088 A1 | | 6/2011 |
| WO | WO 2015/049780 A1 | | 4/2015 |

* cited by examiner

FIG.4

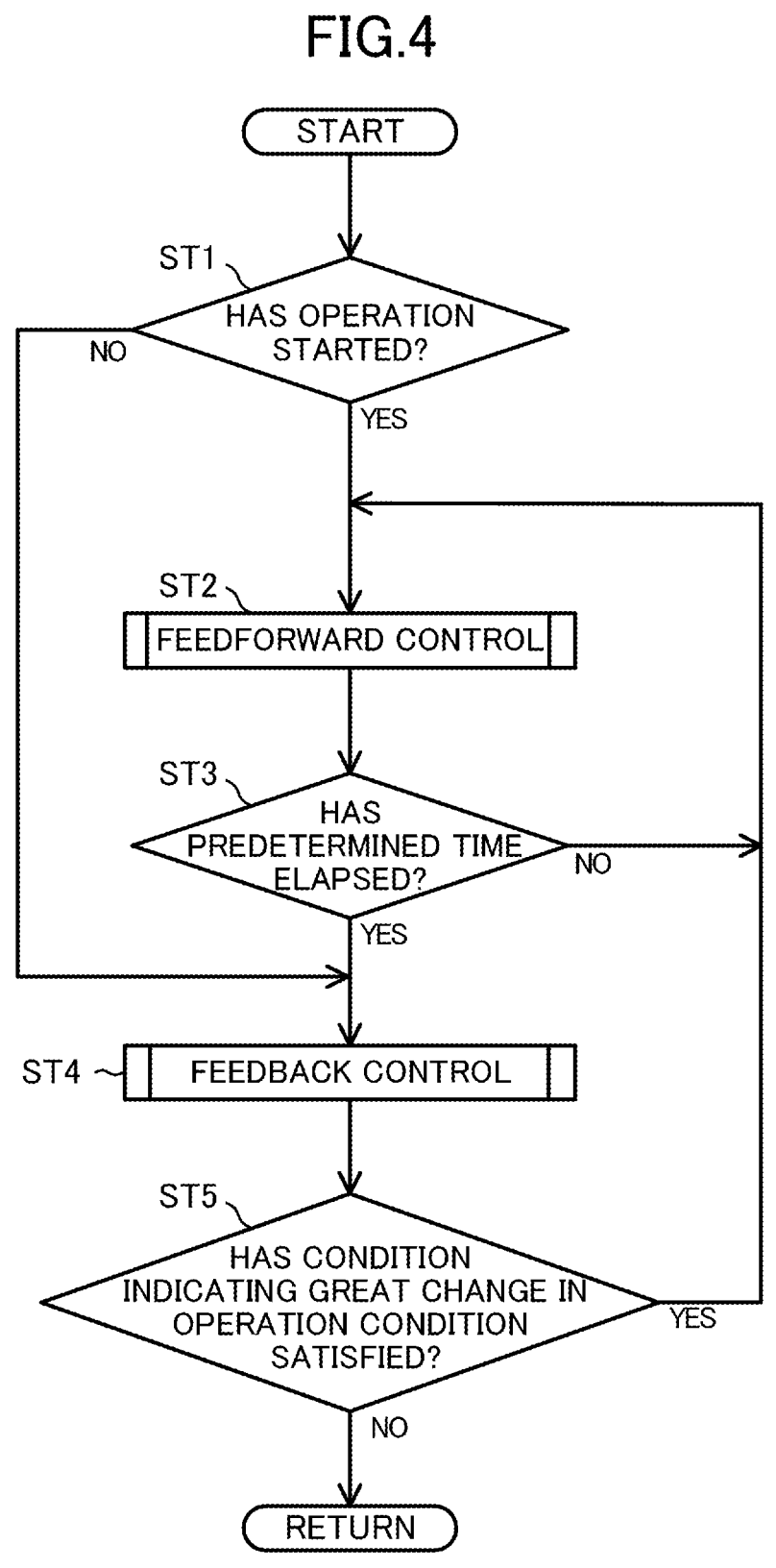

START

ST1 — HAS OPERATION STARTED?

NO

YES

ST2 — FEEDFORWARD CONTROL

ST3 — HAS PREDETERMINED TIME ELAPSED?

NO

YES

ST4 — FEEDBACK CONTROL

ST5 — HAS CONDITION INDICATING GREAT CHANGE IN OPERATION CONDITION SATISFIED?

YES

NO

RETURN

FIG.5

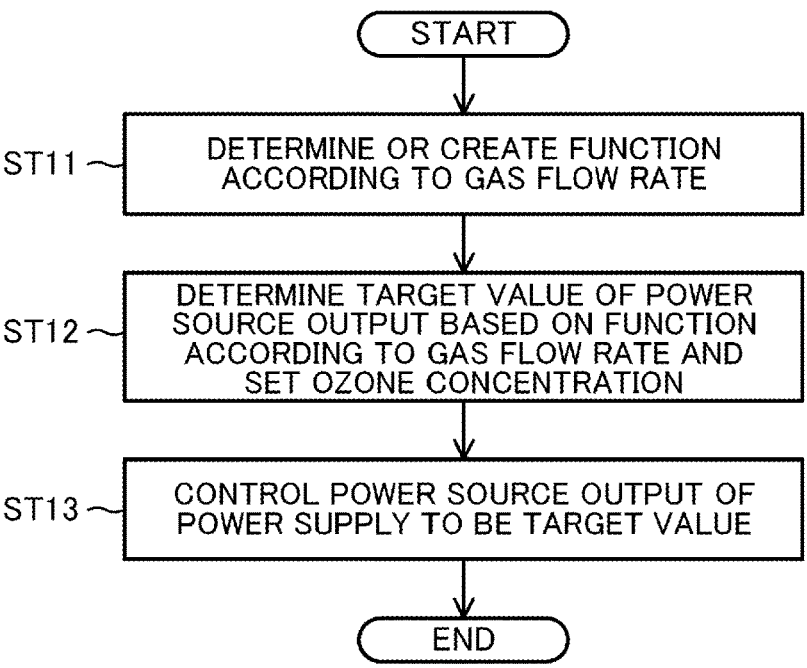

FEEDFORWARD CONTROL

START

ST11 — DETERMINE OR CREATE FUNCTION ACCORDING TO GAS FLOW RATE

ST12 — DETERMINE TARGET VALUE OF POWER SOURCE OUTPUT BASED ON FUNCTION ACCORDING TO GAS FLOW RATE AND SET OZONE CONCENTRATION

ST13 — CONTROL POWER SOURCE OUTPUT OF POWER SUPPLY TO BE TARGET VALUE

END

FIG.6

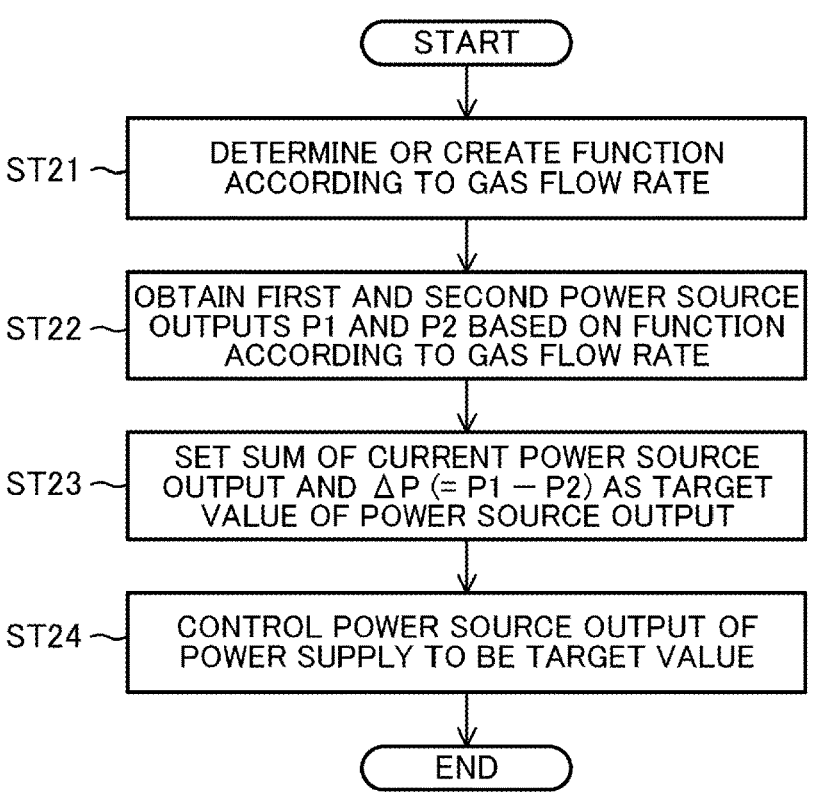

FEEDBACK CONTROL

START

ST21 — DETERMINE OR CREATE FUNCTION ACCORDING TO GAS FLOW RATE

ST22 — OBTAIN FIRST AND SECOND POWER SOURCE OUTPUTS P1 AND P2 BASED ON FUNCTION ACCORDING TO GAS FLOW RATE

ST23 — SET SUM OF CURRENT POWER SOURCE OUTPUT AND $\Delta P$ (= P1 − P2) AS TARGET VALUE OF POWER SOURCE OUTPUT

ST24 — CONTROL POWER SOURCE OUTPUT OF POWER SUPPLY TO BE TARGET VALUE

END

OZONE GENERATING APPARATUS

CROSS REFERENCE TO RELATED APPLICATIONS

This application is a National Stage Application, filed under 35 U.S.C. § 371, of International Application No. PCT/JP2021/016681, filed Apr. 26, 2021, which international application claims priority to and the benefit of Japanese Application No. 2020-132350, filed Aug. 4, 2020; the contents of both of which as are hereby incorporated by reference in their entireties.

BACKGROUND

Technical Field

The present invention relates to an ozonizer.

Description of Related Art

Ozonizers for generating ozone gas are widely used in semiconductor manufacturing processes, for example. Japanese Patent No. 4085043 describes an ozonizer whose power source output is controlled by feedback control.

BRIEF SUMMARY

The feedback control as described in Japanese Patent No. 4085043 compares a detected ozone concentration to a set ozone concentration and increases or decreases the power source output of the ozonizer so that the detected ozone concentration comes closer to the set ozone concentration. The lack of a sufficient consideration of the flow rate of the gas flowing through an ozone generator may cause improper adjustment of the power source output by the feedback control.

Specifically, under the condition of a relatively low gas flow rate, the ozone concentration changes significantly in accordance with a change in the power source output. Under such a condition, the ozone concentration tends to be hunted depending on the adjustment of the power source output. On the other hand, under the condition of a relatively high gas flow rate, the ozone concentration hardly changes in accordance with a change in the power source output. Hence, under such the condition, an insufficient amount of the power source output is adjusted, and the ozone concentration hardly reaches the set ozone concentration. As a result, typical feedback control fails to quickly converge the ozone concentration to the set ozone concentration.

The present disclosure is focused on such the problem. It is an objective of the present disclosure to provide an ozonizer capable of quickly converging an ozone concentration to a set ozone concentration by feedback control regardless of a change in a gas flow rate.

In order to achieve the objective described above, an ozonizer according to the present invention obtains a first power source output corresponding to the set ozone concentration and a second power source output corresponding to the detected ozone concentration based on the set ozone concentration of the ozone generator, an index indicating the gas flow rate of the ozone generator, the detected ozone concentration, and a plurality of functions, and executes feedback control of controlling the power source output based on a difference between the first power source output and the second power source output.

Even with a change in the gas flow rate of the ozone generator, the most suitable amount of adjusting the power source output according to the gas flow rate can be obtained based on the functions. Accordingly, the detected ozone concentration can be quickly converged to the set ozone concentration.

The storage stores three or more functions according to different gas flow rates in one preferred embodiment.

With the use of three or more functions according to the gas flow rates, a more minute change in the gas flow rate can be dealt with. Accordingly, the most suitable amount of adjusting the power source output can be obtained.

In one preferred embodiment, each of the plurality of functions is obtained by linearly connecting a plurality of points each indicating a power source output and an ozone concentration corresponding to the power source output.

Accordingly, the functions can be simplified and load in calculation processing accompanying with the creation of the functions can be reduced.

The control device executes feedforward control to bring the power source output closer to the first power source output upon satisfaction of at least one of a first condition where an index indicating the gas flow rate changes by a predetermined value or more or a second condition where the set ozone concentration changes by a predetermined value or more.

Upon satisfaction of the first or second condition, the difference between the detected ozone concentration and the set ozone concentration increases, which may cause difficulty in converging the detected ozone concentration to the set ozone concentration in the feedback control described above. Upon satisfaction of at least one of the first or second condition, the detected ozone concentration quickly comes closer to the set ozone concentration by bringing the power source output closer to the first power source output corresponding to the set ozone concentration.

In one preferred embodiment, the control device executes an automatic acquisition operation for automatically acquiring the plurality of functions by detecting the detected ozone concentration while changing the gas flow rate.

This automatic acquisition operation allows the automatic creation of a plurality of functions after placing the ozonizer on site.

The present invention provides an ozonizer capable of quickly converging an ozone concentration by feedback control.

BRIEF DESCRIPTION OF THE FIGURES

FIG. 4 is a flowchart of a basic operation of the ozonizer.

FIG. 5 is a flowchart of feedforward control.

FIG. 6 is a flowchart of feedback control.

DETAILED DESCRIPTION OF VARIOUS EMBODIMENTS

Figure 1:
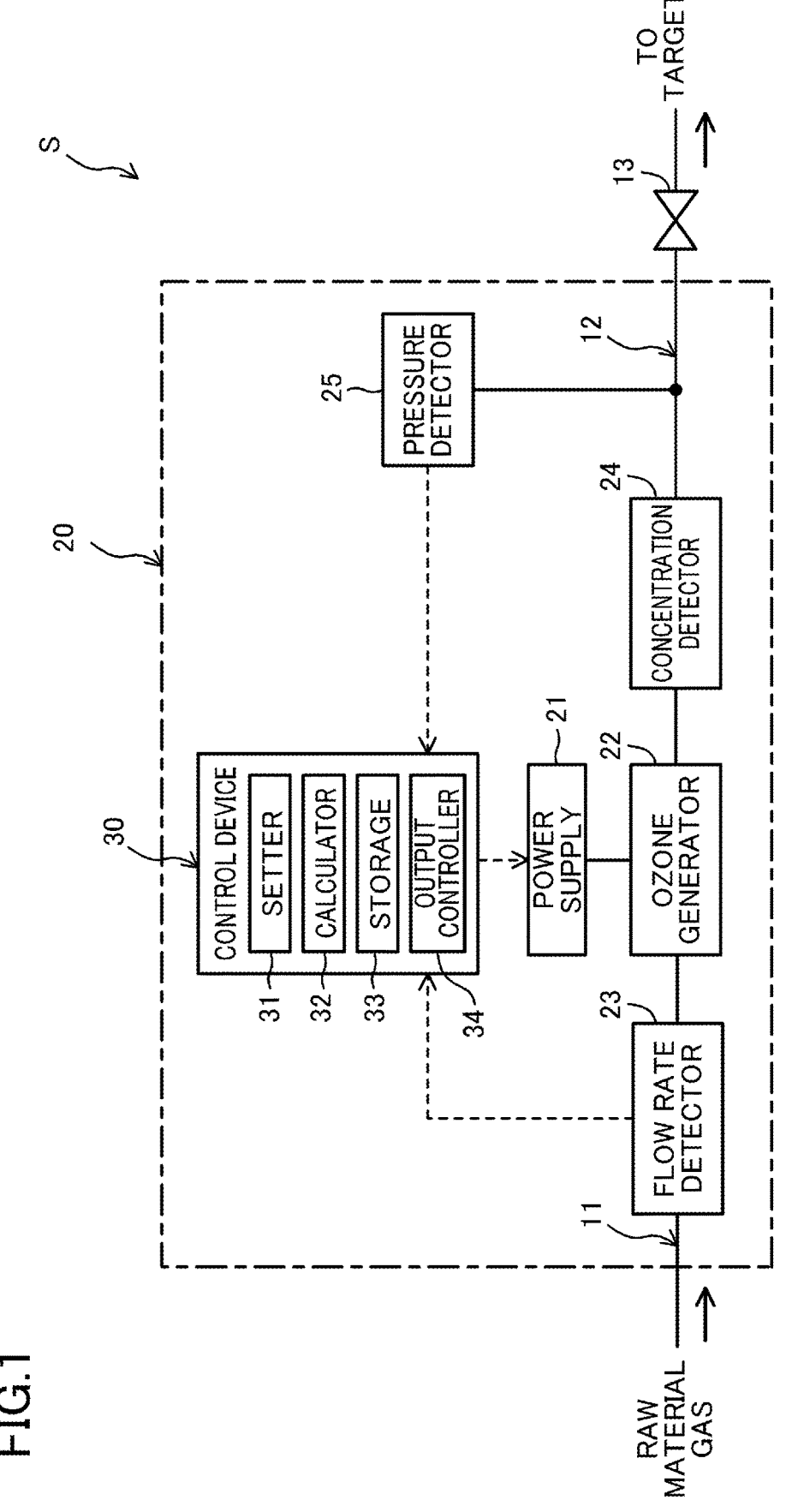
FIG. 1 shows a schematic overall configuration of an ozone generating system that employs an ozonizer according to an embodiment.

Now, an embodiment of the present invention will be described in detail with reference to the drawings. Note that the following embodiment is intrinsically a preferred example and is not intended to limit the scope, application, or use of the present invention.

Embodiment

An ozonizer 20 according to this embodiment is incorporated into an ozone gas generating system S. The ozone gas generating system S is applied to semiconductor manufacturing equipment, for example. The ozone gas generating system S includes a first flow path 11 and a second flow path 12. The first flow path 11 is located at the upstream side of an ozone generator 22. The second flow path 12 is located at the downstream side of the ozone generator 22.

Flowing through the first flow path 11 is a raw material gas. The first flow path 11 is supplied with a raw material gas containing oxygen. The raw material gas may be an oxygen gas with a high purity (99.9% or more). The raw material gas may be a concentrated oxygen gas generated by an oxygen generator, such as a pressure swing adsorption (PSA) type. The raw material gas may be air.

Flowing through the second flow path 12 is the ozone gas generated by the ozone generator 22. The ozone gas is supplied via the second flow path 12 to a predetermined target. The second flow path 12 includes a pressure control valve 13.

Ozonizer

The ozonizer 20 generates ozone gas. The ozonizer 20 includes a power supply 21, the ozone generator 22, a flow rate detector 23, a concentration detector 24, a pressure detector 25, and a control device 30.

The power supply 21 is a high-frequency high-voltage power supply. The power supply 21 supplies a high-voltage power source output to the ozone generator 22.

The ozone generator 22 generates ozone by discharge. The ozone generator 22 is of a silent discharge type. The raw material gas of the first flow path 11 is supplied to the ozone generator 22. Upon supply of power from the power supply 21 to a discharge cell, discharge starts between at least a pair of electrode units. In accordance with this discharge, a part of the raw material gas is converted into ozone. The ozone generated by the ozone generator 22 is supplied via the second flow path 12 to the predetermined target.

The flow rate detector 23 detects, as a detected gas flow rate, the flow rate of the raw material gas flowing through the first flow path 11. The detected gas flow rate is an index indicating the flow rate of the gas flowing through the ozone generator 22.

The concentration detector 24 detects, as a detected ozone concentration Cd, the concentration of the ozone in the ozone gas flowing through the second flow path 12.

The pressure detector 25 detects, as a detected pressure, the pressure at the second flow path 12.

The control device 30 includes a microcomputer and a memory device. The memory device stores software for operating the microcomputer.

The control device 30 receives the detected gas flow rate, the detected ozone concentration Cd, and the detected pressure.

The control device 30 includes a setter 31, a calculator 32, a storage 33, and an output controller 34.

The setter 31 sets, as a set ozone concentration Cs, a target value of the ozone concentration in the ozone gas supplied to the target. The setter 31 receives data for creating a plurality of functions which will be described later in detail.

The calculator 32 creates two or more functions indicating the relationship between the power source output and the ozone concentration corresponding to the power source output in accordance with different gas flow rates in the ozone generator. Here, the phrase "ozone concentration corresponding to the power source output" means the concentration of the ozone in the ozone gas generated by the ozone generator in accordance with a predetermined power source output in an operation of the ozone generator at the power source output.

The storage 33 includes a hard disk drive (HDD), a random-access memory (RAM), a read-only memory (ROM), and a solid-state drive (SSD), for example. The storage 33 stores the functions created by the calculator 32.

The output controller 34 controls the power source output (i.e., the discharge output) of the power supply 21. With a change in the power source output, the amount of ozone generated by the ozone generator 22 changes. Accordingly, the concentration of ozone in the ozone gas supplied to the target changes.

The output controller 34 performs feedback control of the power source output. In addition, the output controller 34 performs feedforward control of the power source output upon satisfaction of at least one of a first or second condition which will be described later in detail. The output controller 34 executes feedback and feedforward controls based on the functions stored in the storage 33.

Functions

Figure 2:
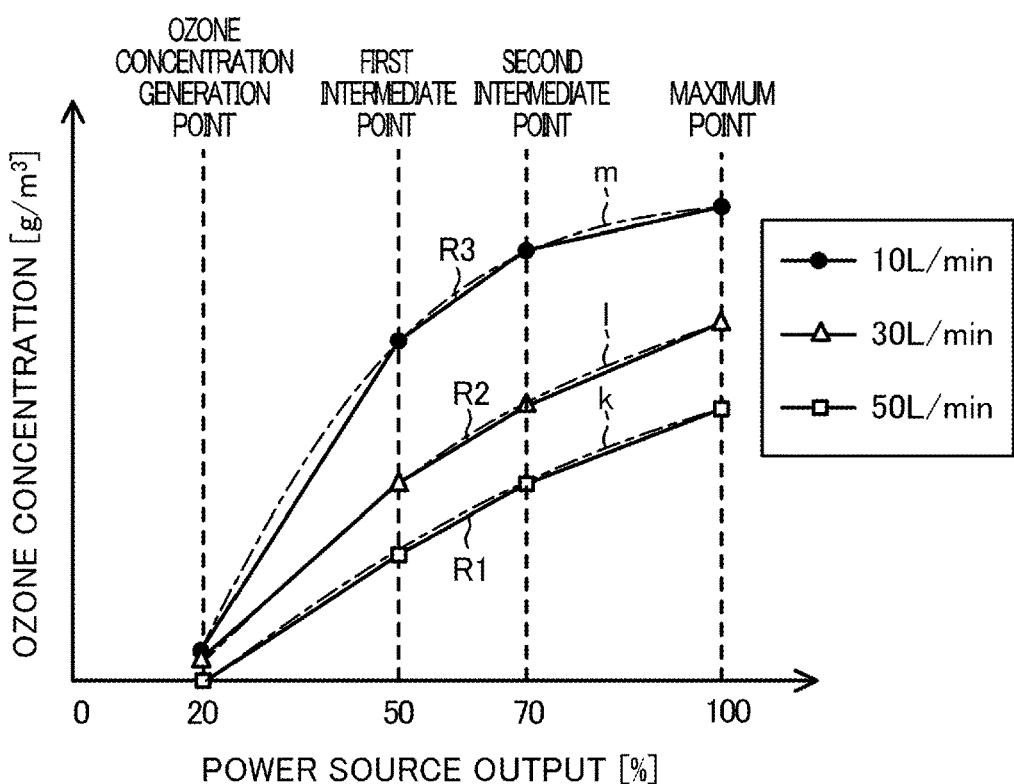
FIG. 2 is a graph showing characteristics of a plurality of functions stored in a storage.

As shown in FIG. 2, the functions are stored in the storage 33. These functions are created by the calculator 32. In this embodiment, the calculator 32 creates the functions based on the data input to the setter 31 by a person (e.g., a user, an installer, or a maintenance operator).

The functions are information indicating the relationship between the power source output of the power supply 21 and the ozone concentration corresponding to this power source output. These functions are determined in accordance with the gas flow rates. As characteristics of these functions, the ozone concentration increases with an increase in the power source output. As additional characteristics of these functions, the inclinations decrease with an increase in the power source output. The inclinations of these functions tend to increase with a decrease in the gas flow rate.

In this embodiment, the storage 33 stores three functions. The three functions are namely a first function R1, a second function R2, and a third function R3.

The first function R1 corresponds to the maximum gas flow rate of the ozone generator 22. The first function R1 in this example corresponds to a gas flow rate of 50 L/min. The third function R3 corresponds to the minimum gas flow rate. The third function in this example corresponds to a gas flow rate of 10 L/min. The second function R2 corresponds to an intermediate gas flow rate between the maximum and minimum gas flow rates. The second function R2 in this example corresponds to a gas flow rate of 30 L/min.

In one preferred embodiment, the maximum, minimum, and intermediate gas flow rates are gas rates that most often flow through the ozone generator 22 in an actual operation of the ozonizer 20. In one preferred embodiment, the maximum gas flow rate is the highest flow rate of the gas that can be supplied to the ozone generator 22. In one preferred embodiment, the minimum gas flow rate is lower than or equal to the lowest flow rate of the gas that can be supplied to the ozone generator 22.

The three functions are determined based on an ozone concentration generation point, the maximum point, a first intermediate point, and a second intermediate point. The ozone concentration generation point indicates the minimum power source output necessary for generating ozone in the ozone generator 22, and an ozone concentration corresponding to the power source output. The ozone concentration generation point is determined by the structure or system of the power supply 21 or other elements and does not vary greatly irrespective of the gas flow rates. The ozone concentration generation point may thus be the same value independently of the gas flow rates. The power source output is 20% at the ozone concentration generation point in this example.

The maximum point indicates the maximum power source output of the power supply 21, and the ozone concentration corresponding to the power source output. The power source output at the maximum point is 100%. The first and second intermediate points correspond to predetermined power source outputs between the ozone concentration generation point and the maximum point. In this example, the power source output is 50% at the first intermediate point and 70% at the second intermediate point.

A person sets the ozone concentration generation point, the maximum point, the first intermediate point, and the second intermediate point for each of gas flow rates in the control device 30. These points are determined based on a measured value obtained in accordance with the gas flow rates after placing the ozonizer 20 in equipment.

The calculator 32 creates a plurality of functions for each of the gas flow rates based on these points. Specifically, the calculator 32 creates functions like a curve by connecting the respective points of the maximum, minimum, and intermediate gas flow rates with a straight line.

In FIG. 2, chain lines k, l, and m are graphic charts each showing an experimentally obtained relationship between the power source output and the ozone concentration in accordance with the gas flow rate. K, l and m each specify the relationship between the power source output and the ozone concentration more accurately through change of the power source output at smaller intervals than in the case of the three functions. K corresponds to the gas flow rate of 50 L/min, l corresponds to the gas flow rate of 30 L/min, and m corresponds to the gas flow rate of 10 L/min. As apparent from FIG. 2, the three functions obtained by the calculator 32 substantially agree with the graphs k, l, and m. It is thus clear that the relationship between the ozone concentration and the power source output in accordance with the gas flow rates can be specified accurately by the three functions.

Operation

The operation of the ozonizer 20 will be described in detail with reference to FIGS. 3 to 6.

Prior to the operation of the ozonizer 20 according to this embodiment, the storage 33 stores the three functions acquired as described above.

As shown in FIG. 4, after the start of the operation of the ozonizer 20 (YES in step ST1), the flow shifts to step ST2 to execute feedforward control.

As shown in FIG. 5, in step ST11 of the feedforward control, the calculator 32 determines or creates a function according to the gas flow rate.

For example, at a detected gas flow rate of 10 L/min, the third function R3 created in advance is used as it is. For example, if the detected gas flow rate does not correspond to the flow rate of the function created in advance, a new function is created.

Figure 3:
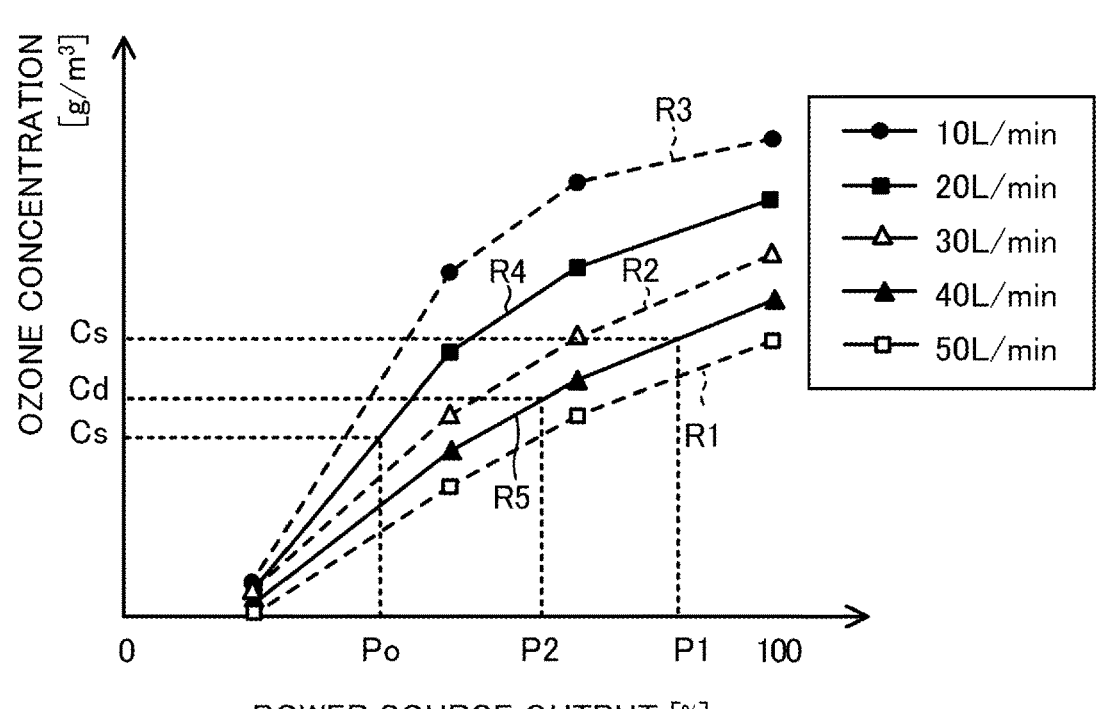
FIG. 3 is a graph corresponding to FIG. 2 and further includes a plurality of newly created functions.

The ozone concentration generation point, the maximum point, the first intermediate point, and the second intermediate point vary proportionally in accordance with the gas flow rates. For example, at a gas flow rate of 20 L/min, as shown in FIG. 3, each of the points of the newly created functions is determined at an intermediate position (at a half distance) between the second and third functions R2 and R3. The calculator 32 creates a new function (e.g., a fourth function R4 shown in FIG. 3) based on the ozone concentration generation point, the maximum point, the first intermediate point, and the second intermediate point corresponding to the gas flow rate of 20 L/min. The fourth function R4 is created by linearly connecting these points.

For example, at a gas flow rate of 40 L/min, as shown in FIG. 3, each of the points of the newly created functions is determined at an intermediate position (at a half distance) between the first and second functions R1 and R2. The calculator 32 creates a new function (e.g., a fifth function R5 shown in FIG. 3) based on the ozone concentration generation point, the maximum point, the first intermediate point, and the second intermediate point corresponding to the gas flow rate of 40 L/min. The fifth function R5 is created by linearly connecting these points.

In step ST12, the calculator 32 determines a target value of the power source output based on the function corresponding to the currently detected gas flow rate. Specifically, the calculator 32 sets, as a target value, the power source output corresponding to the set ozone concentration Cs in the function corresponding to the currently detected gas flow rate. The example of FIG. 3 shows the target value Po of the power source output corresponding to the set ozone concentration Cs in the fourth function R4 at a currently detected gas flow rate of 20 L/min.

In step ST13, the output controller 34 controls the power supply 21 to set the actual power source output of the power supply 21 to the target value obtained in step ST12.

As shown in FIG. 6, the feedforward control is repeatedly executed in step ST3 until a predetermined time elapses. In the case of the repetitive execution of the feedforward control, the power source output may be increased stepwise so that the actual power source output of the power supply 21 eventually reaches the target value Po described above.

By executing the feedforward control at the start of operation of the ozonizer 20, the concentration of the ozone in the ozone gas supplied to the target can quickly come closer to the set ozone concentration Cs.

After the elapse of the predetermined time in step ST3, the process shifts to step ST4 to execute feedback control.

As shown in FIG. 5, in step ST21, for example, at a detected gas flow rate of 10 L/min, the third function R3 created in advance is used as it is. For example, if the detected gas flow rate does not correspond to the flow rate of the function created in advance, a new function is created. The way to create a new function is the same as in the case of the feedforward control described above. Specifically, the calculator 32 determines the ozone concentration generation point, the maximum point, the first intermediate point, and the second intermediate point using the proportional distribution according to the flow rates based on the three functions. The calculator 32 linearly connects these points to create a new function.

In step ST22, the calculator 32 obtains a first power source output P1 corresponding to the set ozone concentration Cs and a second power source output P2 corresponding to the detected ozone concentration based on the function corresponding to the currently detected gas flow rate. FIG. 3 shows the first power source output P1 corresponding to the set ozone concentration Cs and the second power source output P2 corresponding to the detected ozone concentration Cd at a gas flow rate of 40 L/min.

Next, in step ST23, the calculator 32 calculates the difference ΔP (=P1−P2) between the first and second power source outputs P1 and P2. Next, the calculator 32 sets, as a target value of the power source output, the sum of the current power source output Pc and ΔP. ΔP corresponds to the amount of adjusting the power source output.

Accordingly, the power source output increases where the first power source output P1 is larger than the second power source output P2. On the other hand, the power source output decreases where the first power source output P1 is smaller than the second power source output P2.

In step ST24, the output controller 34 controls the power supply 21 to set the actual power source output of the power supply 21 to the target value obtained in step ST23.

In the feedback control as described above, the power source output difference ΔP is obtained based on a function according to the gas flow rate of the ozone generator 22, and the target value of the power source output is determined based on the difference ΔP. As a result, the power source output can be controlled suitably in sufficient consideration of the characteristics of the ozone concentration and the power source output according to the gas flow rate.

As shown in FIG. 4, if the condition in step ST5 is not satisfied after the feedback control, the feedback control in step ST4 is repeatedly executed via step ST1. Here, in one preferred embodiment, the time interval ΔTb of the feedback control is determined in view of the time (i.e., replacement time ΔTr) of replacing the gas in the pipe extending from the ozone generator 22 to the concentration detector 24. Specifically, the setter 31 of the control device 30 sets, as a parameter, the volume V in the pipe. The replacement time ΔTr can be calculated based on the volume V in the pipe and the detected gas flow rate. In one preferred embodiment, the time interval ΔTb of the feedback control is at least longer than or equal to the replacement time ΔTr.

The replacement time ΔTr may be calculated based on the detected pressure described above in addition to the volume V in the pipe and the detected gas flow rate.

The time interval ΔTb of the feedback control may be determined in view of the influence of a delay of a change in the detected ozone concentration Cd from a change in the output voltage, the ozone diffusion, or other factors. In view of such influences, the time interval ΔTb is set to the time obtained by multiplying the replacement time ΔTr by a predetermined coefficient α in one preferred embodiment. Here, the coefficient α is set larger than 1, namely about 2 to 3 in one preferred embodiment.

If the condition in step ST5 is satisfied after the feedback control in step ST4, the process shifts to step ST2 to execute the feedforward control again. In step ST5, it is determined whether or not a condition indicating that the operating condition has changed greatly is satisfied. Specifically, this condition includes the following first and second conditions.

As the first condition, the detected gas flow rate, which is an index indicating the gas flow rate, changes by a value equal to or more than a predetermined value. As the second condition, the set ozone concentration Cs changes by a value equal to or more than a predetermined value. In step ST5, upon satisfaction of at least one of the first or second condition, the process shifts to step ST4 to execute feedforward control.

With a great change in the flow rate of the gas flowing through the ozone generator 22, the difference between the detected ozone concentration Cd and the set ozone concentration Cs increases in the feedback control, whereby the detected ozone concentration Cd may fail to come closer to the set ozone concentration Cs quickly. On the other hand, the feedforward control described above is executed upon satisfaction of the first condition, which allows the detected ozone concentration Cd to quickly come closer to the set ozone concentration Cs.

With a great change in the set ozone concentration Cs, the difference between the detected ozone concentration Cd and the set ozone concentration Cs increases in the feedback control, whereby the detected ozone concentration Cd may fail to come closer to the set ozone concentration Cs quickly. On the other hand, the feedforward control described above is executed upon satisfaction of the second condition, which allows the detected ozone concentration Cd to quickly come closer to the set ozone concentration Cs.

In step ST5, the satisfaction of only the first condition or the second condition may be determined.

Advantages of Embodiment

In the feedback control according to the embodiment described above, the control device 30 obtains the first power source output P1 corresponding to the set ozone concentration Cs and the second power source output P2 corresponding to the detected ozone concentration Cd based on the set ozone concentration Cs of the ozone generator 22, an index indicating the gas flow rate of the ozone generator, the detected ozone concentration Cd, and the functions. The control device 30 controls the power source output based on a difference between the first power source output P1 and the second power source output P2.

Hence, the power source output of the power supply 21 is adjusted in view of the characteristics of the relationship between the power source output and the ozone concentration according to the gas flow rate. Accordingly, this adjustment reduces a significant hunting of the detected ozone concentration Cd due to an excessive amount of adjusting the power source output under the condition of a low gas flow rate, for example. The adjustment also reduces insufficient adjustment of the power source output and delayed approach of the detected ozone concentration Cd to the set ozone concentration Cs under the condition of a high gas flow rate, for example. As a result, this embodiment allows quick convergence of the actual ozone concentration to the set ozone concentration.

In the feedforward control according to the embodiment described above, the control device 30 controls the power source output to come closer to the first power source output P1. The first power source output P1 corresponds to the set ozone concentration Cs according to the gas flow rate. Accordingly, under the condition of a relatively large difference between the detected ozone concentration Cd and the set ozone concentration Cs, the most suitable power source output according to the gas flow rate can be obtained, which allows the detected ozone concentration Cd to quickly come closer to the set ozone concentration Cs.

The functions stored in the storage 33 are obtained by linearly connecting a plurality of points indicating a power source output and an ozone concentration corresponding to the power source output. Accordingly, these functions can be simplified, and load on the calculator 32 can be reduced.

If the gas flow rate does not correspond to the functions stored in the storage 33, a plurality of points are obtained by a proportional distribution according to the flow rate, and a new function is created based on these points. Accordingly, even if the detected gas flow rate does not correspond to the gas flow rate stored in the storage 33, the most suitable power source output corresponding to the detected gas flow rate can be obtained.

Since there are three functions stored in the storage 33, a most suitable power source output can be obtained corresponding to a minute change in the gas flow rate.

The functions stored in the storage 33 are obtained by linearly connecting a plurality of points indicating a power source output and an ozone concentration corresponding to the power source output. Accordingly, these functions can be simplified, and the load on the calculator 32 can be reduced.

Feedforward control is executed upon satisfaction of at least one of the first or second condition. Accordingly, the control allows the detected ozone concentration Cd to quickly come closer to the set ozone concentration Cs under the condition of a relatively large difference between the detected ozone concentration Cd and the set ozone concentration Cs.

Feedforward control is executed at the start of an operation. Accordingly, the control allows the detected ozone concentration Cd to quickly come closer to the set ozone concentration Cs under the condition of a relatively large difference between the detected ozone concentration Cd and the set ozone concentration Cs.

Variation of Embodiment

The embodiment described above may include a configuration according to the following variation.

Figure 7:
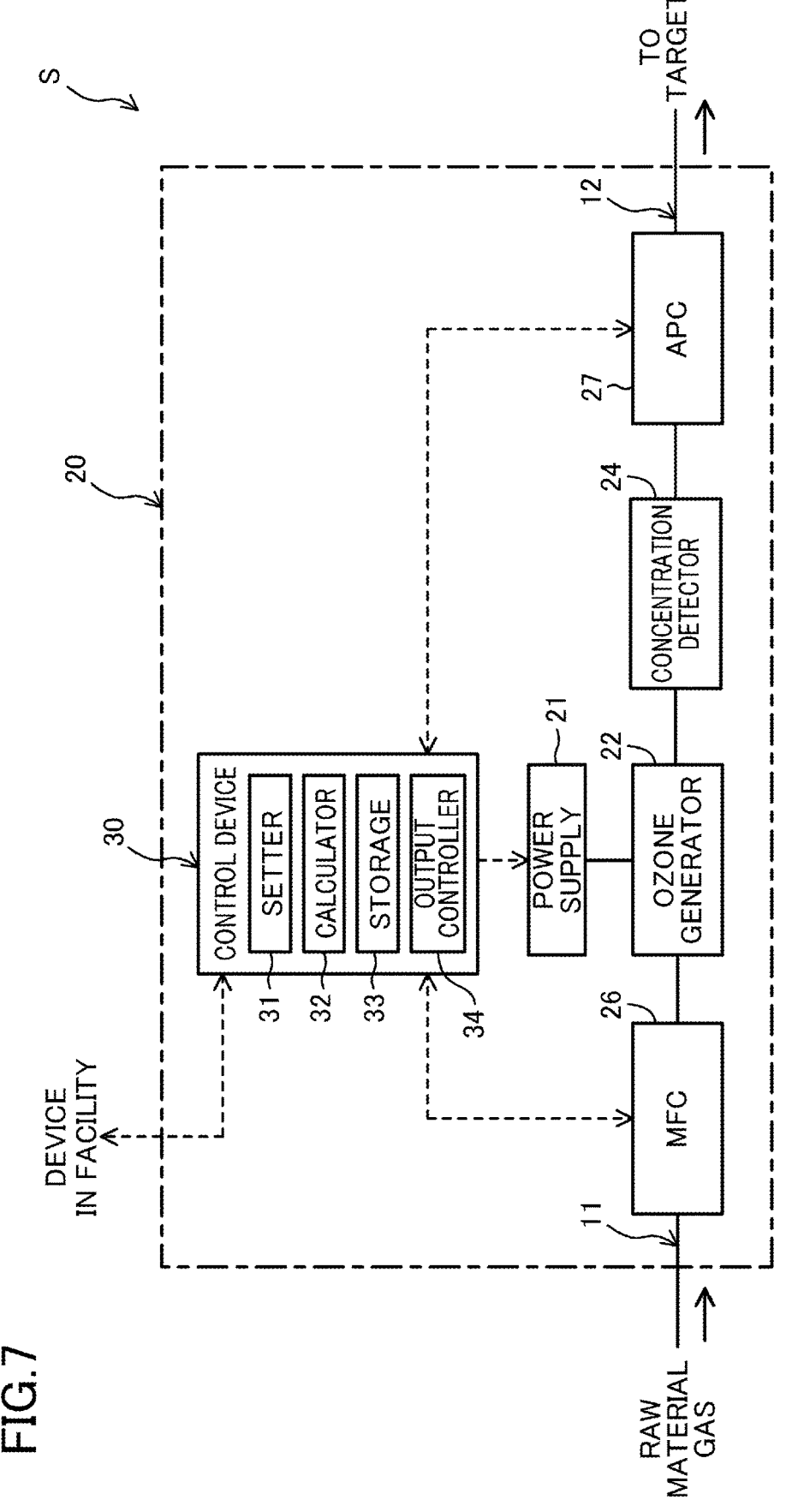
FIG. 7 is a view according to a variation and corresponding to FIG. 1.

The variation shown in FIG. 7 differs from the embodiment described above in the configuration of the ozonizer 20.

The ozonizer 20 includes an automatic regulating valve, such as a mass flow controller (MFC) 26, in place of the flow rate detector 23 according to the embodiment described above. The MFC 26 controls to set the flow rate of the gas supplied to the ozone generator 22 to a set gas flow rate that is set in advance. The set gas flow rate is determined in accordance with a set value input to the control device 30 or a request from a device in a facility that uses the ozonizer 20.

The ozonizer 20 includes an automatic pressure control valve, such as an automatic pressure controller (APC) 27 in place of the pressure detector 25 and the pressure control valve 13 according to the embodiment described above. The APC 27 controls to set the primary pressure to a preset pressure.

In the first variation, not the detected gas flow rate but the set gas flow rate is used as an index indicating the gas flow rate. Specifically, in step ST21 of the feedback control, a function corresponding to the set gas flow rate is determined or created. In steps ST22 to ST24, similar control is performed based on the function corresponding to the set gas flow rate.

Similarly, in step S11 of the feedforward control, a function corresponding to the set gas flow rate is determined or created. In steps ST12 to ST13, similar control is performed based on the function corresponding to the set gas flow rate.

With the use of the function corresponding to the set gas flow rate in this manner, the power source output can be controlled to be an eventual target value even if the actual gas flow rate does not easily converge to the set gas flow rate. Accordingly, the ozone concentration is quickly converged to the set ozone concentration Cs in feedback and feedforward controls.

In the first variation, a function corresponding to the detected gas flow rate detected by the MFC 26 may be used as described above in the embodiment.

In the first variation, the locations of the MFC 26 and the APC 27 may be interchanged. In this case, the APC 27 sets the secondary pressure to a preset pressure.

Automatic Acquisition Operation

The control device 30 according to the first variation executes an automatic acquisition operation. The automatic acquisition operation is executed after placing the ozonizer 20 in a facility. The automatic acquisition operation is executed before the start of the first operation of the ozonizer 20.

The automatic acquisition operation is for automatically acquiring a plurality of functions. Thus, the control device 30 includes a setter that sets a plurality of gas flow rates corresponding to the functions and a plurality of power source outputs for generating a function for each gas flow rate.

In an automatic creation of the three functions according to the embodiment described above, 10 L/min, 30 L/min, and 50 L/min are set as the gas flow rates. Set as the power source outputs are 20% corresponding to the ozone concentration generation point, 100% corresponding to the maximum point, 50% corresponding to the first intermediate point, and 70% corresponding to the second intermediate point. In the automatic acquisition operation, these set gas flow rates and the detected ozone concentrations Cd corresponding to the set power source outputs are sequentially measured. Note that the ozone concentration corresponding to the ozone concentration generation point is determined by the structure or system of the power supply 21 or other elements as described above. In the automatic acquisition operation, the measurement at the power source output corresponding to the ozone concentration generation point may be omitted.

Specifically, in the automatic acquisition operation, the gas flow rate is adjusted to the set value (e.g., 10 L/min) described above by the MFC 26. Under the condition of a gas flow rate of 10 L/min, the output controller 34 sets the power source output to a predetermined set value. At this time, the concentration detector 24 detects the ozone concentration after the elapse of a predetermined time for stabilizing the ozone concentration. Next, the output controller 34 changes the power source output to a different set value at the same gas flow rate, and then the concentration detector 24 detects the ozone concentration. With this procedure, data at the points (e.g., the ozone concentration generation point, the maximum point, the first intermediate point, and the second intermediate point) corresponding to the gas flow rate of 10 L/min can be acquired. Based on the data, the third function R3 shown in FIG. 3 can be created. These data and functions are stored in the storage 33.

The control device 30 repeats the same operation while changing the gas flow rate. Accordingly, in the automatic acquisition operation, a plurality of functions at different gas flow rates can be automatically created. As a result, after placing the control device 30, most suitable functions corresponding to the placement environment can be obtained without requiring the input of data by a human.

Other Embodiments

The embodiment and variation described above may employ the following configuration.

The ozonizer 20 according to the embodiment described above supplies the ozone gas (or fluid) generated by the ozone generator 22 to a target. However, the ozonizer 20 may dissolve the ozone gas generated by the ozone generator 22 in water to generate ozone water which is to be supplied to the target.

The storage 33 may store two, four or more functions.

For creating a plurality of functions, two points may be used but three or more points are preferable, and four or more are more preferable in the embodiment described above. These points include at least an ozone concentration generation point and a maximum point in one preferred embodiment.

The ozone generator 22 is not necessarily of a silent discharge type but may be of a creeping discharge or electrolytic type, for example.

As described above, the present invention is useful as an ozonizer.

The invention claimed is:

1. An ozonizer including a power supply and an ozone generator configured to generate ozone gas in accordance with a power source output of the power supply, the ozonizer comprising:

a concentration detector configured to detect, as a detected ozone concentration, a concentration of ozone in the ozone gas generated by the ozone generator; and a control device, the control device including a storage configured to store two or more functions indicating a relationship between the power source output and an ozone concentration corresponding to the power source output in accordance with different gas flow rates in the ozone generator, the control device obtaining a first power source output corresponding to a set ozone concentration and a second power source output corresponding to the detected ozone concentration based on the set ozone concentration of the ozone generator, an index indicating the gas flow rate of the ozone generator, the detected ozone concentration, and the two or more functions, and executing feedback control of controlling the power source output based on a difference between the first power source output and the second power source output.

2. The ozonizer of claim 1, wherein the storage stores three or more functions corresponding to different gas flow rates.

3. The ozonizer of claim 1, wherein each of the functions is obtained by linearly connecting a plurality of points each indicating a power source output and an ozone concentration corresponding to the power source output.

4. The ozonizer of claim 1, wherein the control device executes feedforward control to bring the power source output closer to the first power source output upon satisfaction of at least one of a first condition where the index indicating the gas flow rate changes by a value equal to or more than a predetermined value and a second condition where the set ozone concentration changes by a value equal to or more than a predetermined value.

5. The ozonizer of claim 1, wherein the control device executes an automatic acquisition operation for automatically acquiring the functions by detecting the detected ozone concentration while changing the gas flow rate.

\* \* \* \* \*